(12) United States Patent
Theros et al.

(10) Patent No.: US 6,581,939 B1
(45) Date of Patent: Jun. 24, 2003

(54) BEARING END CAP WITH INTEGRATED SEAL

(75) Inventors: Adam M. Theros, Warrenville, IL (US); James A. Parejko, Plainfield, IL (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 0 days.

(21) Appl. No.: 09/718,988

(22) Filed: Nov. 22, 2000

(51) Int. Cl.$^7$ ................................ F16J 15/38

(52) U.S. Cl. ........................ 277/394; 384/489

(58) Field of Search ................ 277/630, 637, 277/640, 641, 642, 644, 648, 650, 925, 922; 384/489; 215/317, 321; 220/304, 795, 378; 174/50.5, 50.51, 52.3, 52.4; 138/89

(56) References Cited

U.S. PATENT DOCUMENTS

| | | | | |
|---|---|---|---|---|
| 3,305,119 A | * | 2/1967 | Reynolds | 215/321 |
| RE33,003 E | * | 8/1989 | Dugan | 92/84 |
| 5,080,787 A | * | 1/1992 | Brown et al. | 210/232 |
| 5,195,807 A | * | 3/1993 | Lederman | 301/108.1 |
| 5,217,137 A | * | 6/1993 | Andrews | 220/366.1 |
| 5,277,327 A | * | 1/1994 | Nakano et al. | 220/304 |
| 5,852,854 A | * | 12/1998 | Pierrot et al. | 24/297 |
| 5,868,273 A | * | 2/1999 | Daenen et al. | 215/341 |
| 5,992,660 A | * | 11/1999 | Miura et al. | 215/321 |
| 6,364,152 B1 | * | 4/2002 | Poslinski et al. | 220/378 |

* cited by examiner

Primary Examiner—Anthony Knight
Assistant Examiner—Doug Hutton
(74) Attorney, Agent, or Firm—McDonnell Boehnen Hulbert & Berghoff

(57) ABSTRACT

A bearing end cap having a circular mounting surface, a sidewall adjacent to the mounting surface, a seal groove positioned in the mounting surface, and an integrated seal positioned in the seal groove.

19 Claims, 2 Drawing Sheets

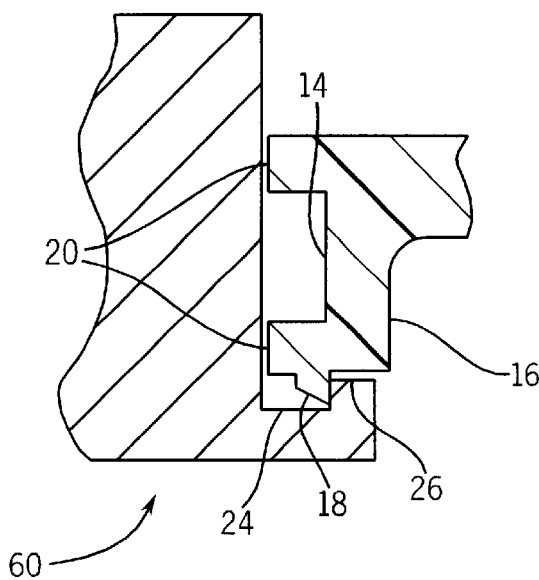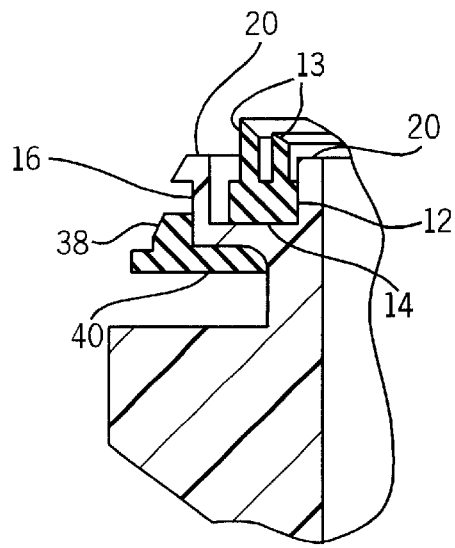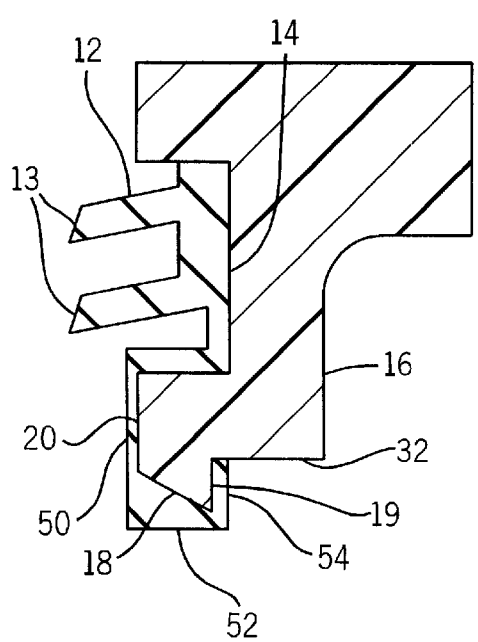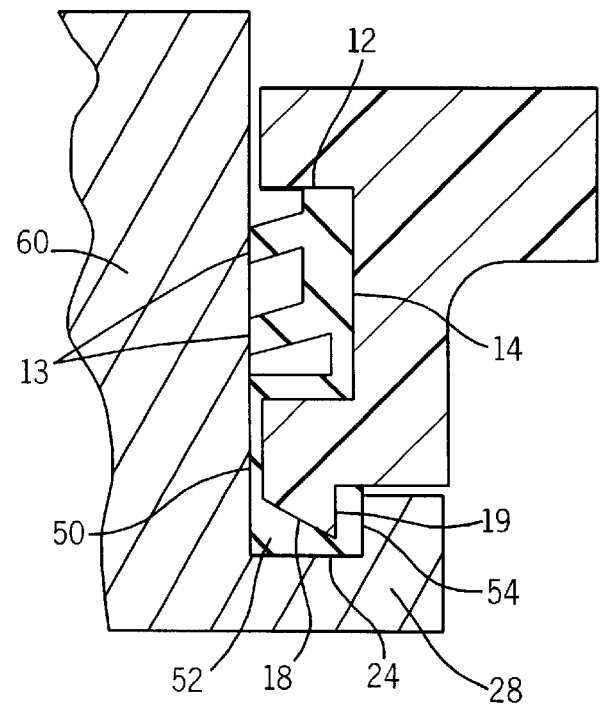

BEARING END CAP WITH INTEGRATED SEAL

BACKGROUND OF INVENTION

1. Field of Invention

This invention is directed generally to bearing assemblies, and more particularly to a sealed bearing end cap adapted for attachment to a bearing assembly mounted to a rotating shaft.

2. Background of the Invention

For years, bearing assemblies have been used on rotating shafts. For example, in automated conveyor lines, bearing assemblies are mounted to rotating shafts. In many applications, the bearing assemblies are subjected to harsh operating conditions involving liquid, gaseous, and solid contaminants. The field of beverage bottling presents one particularly harsh environment. Bearings are subjected to spilled juices such as orange and grape juice, and acidic lemonade. Sports drinks, beer, ginger ale, and cola also represent harmful contaminants that may come in contact with the bearing and reduce bearing life. Other packaging and handling environments also subject bearing assemblies to potentially caustic materials. In these applications, it is very important for the lines to continue running, without unscheduled downtime. A bearing failure can result in shutting an entire line down while repairs or replacement bearings are provided. Such costly downtime is to be avoided at all costs.

Consequently, efforts have been made to provide corrosion resistant bearings and bearing assemblies that include various, and oftentimes, intricate sealing arrangements. One such line of bearings is the SEALMASTER® Gold Line Corrosion Resistant Bearings that are specially designed and manufactured for abrasive and wet environments. In addition, bearing end caps have been provided at the end of a rotating shaft to provide an additional line of defense against harmful contaminants and potentially corrosive materials. One such bearing end cap has been provided in the form of a stainless steel end cap that is typically bolted to the bearing housing. As an alternative to a bolted mounting, the end cap can be provided with exterior retention snaps that snap fit into a corresponding groove in the housing to mount the end cap to the bearing housing. The end cap may be either closed, where the end of the rotating shaft is positioned inside the end cap, or it may be open, where the rotating shaft is allowed to pass the through the end cap. The use of bearing end caps in such situations has provided an added measure of protection to keep contaminants out of the bearing. To provide further protection for the bearing, a seal may be placed between the end cap and the bearing housing. Some end caps are provided with an O-Ring type elastomeric seal that is placed within a mounting surface of the end cap. While providing some additional protection, this type of seal suffers from several drawbacks. First, the O-Ring seal does not provide the maximum sealing between the end cap and the bearing housing. In addition, bearing end caps are often removed from bearing housings during maintenance and cleaning. The O-Ring is separate and distinct from the end cap and can become separated and lost while the end cap is removed. When an O-Ring becomes lost with no replacement readily available, the end cap may be reattached to the bearing housing without the use of any seal. This is undesirable because contaminants and other materials can more easily infiltrate the bearing.

Accordingly, there is a need to provide a bearing end cap having improved sealing capabilities. In addition, there is a need to provide a sealed bearing end cap where the seal cannot be separated from the end cap and subsequently misplaced or lost. In addition, there is a need to provide a low-cost method of producing a sealed bearing end cap.

SUMMARY OF THE INVENTION

The present invention is specifically directed to a bearing end cap adapted for mounting to a bearing housing. The bearing end cap includes a circular mounting surface positioned on a front surface of the end cap. The circular mounting surface is adapted to be mounted into a corresponding circular groove of the bearing housing. The end cap preferably includes a retention ring having a plurality of spaced apart retention snaps that interact with a circular groove of the bearing housing to secure the end cap to the bearing housing. In the disclosed embodiments, the end cap is provided with an integrated seal positioned in an annular seal groove on the mounting surface of the end cap. The integrated seal is preferably overmolded onto the annular seal groove of the end cap in a secondary molding operation. The integrated seal provides a seal between the mounting surface of the end cap and the bearing housing. In addition, the integrated seal may also extend to cover the retention snaps to provide a seal between the retention snaps and the circular groove of the bearing housing. Further, the end cap may also be provided with a secondary integrated seal positioned radially outwardly from the retention ring of the end cap to provide additional sealing between the end cap and the bearing housing. The disclosed embodiments provide for improved sealing between the end cap and the bearing housing. In addition, the overmolded integrated seal reduces the chance that the seal will become separated from the end cap and misplaced or lost, and ensures that the seal will be in proper position when the bearing end cap is attached to the bearing housing. Moreover, the end cap with an integrated seal can be cost-effectively manufactured using conventional injection molding and overmolding techniques.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIG. 2 is a cross-sectional view of a bearing end cap, without a seal, positioned in a bearing housing.

FIG. 3 is a cross-sectional view of the bearing end cap of FIG. 1.

FIG. 4 is a cross-sectional view of an alternate embodiment of a bearing end cap of the present invention having an integrated seal that extends over the retention snaps.

FIG. 5 is a cross-sectional view of the bearing end cap of FIG. 4 positioned in a bearing housing.

Figure 1:
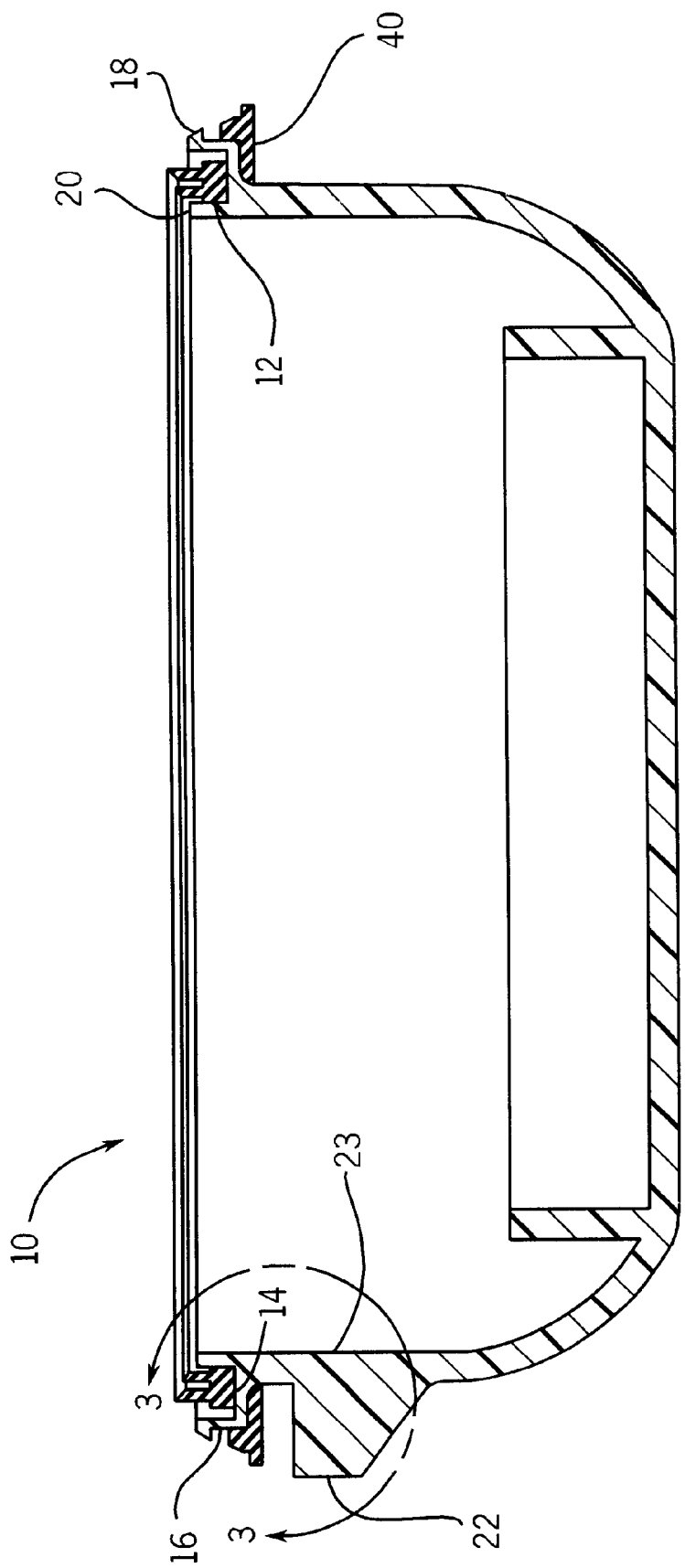
FIG. 1 is a side cross-sectional view of a bearing end cap of the present invention having a primary integrated seal and a secondary integrated seal.

While the invention is susceptible to various modifications and alternative forms, specific embodiments thereof are shown by way of example in the drawings and will herein be described in detail. It should be specifically understood with respect to the drawings, that the drawings are of preferred alternate embodiments, and there are many other embodiments and forms in which the present invention may appear. It should also. be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

In addition, while the present invention is particularly useful in applications for use in conveyors in the bottling and beverage industry where harsh operating conditions may be present, the end cap of the present invention may be used for any other application where the use of an end cap would be suitable.

DETAILED DESCRIPTION OF THE PREFERRED EMBODIMENT

A bearing end cap 10 made in accordance with the principles of the present invention is depicted in FIGS. 1–5. As shown in FIG. 1, bearing end cap 10 includes a primary integrated seal 12 positioned within annular end cap seal groove 14 in circular mounting surface 20 of retention ring 16. The circular mounting surface 20 is adapted to be mounted into a corresponding circular groove of a bearing housing (not shown in FIG. 1). Retention ring 16 includes a plurality of spaced apart retention snaps 18 that interact with a circular groove of the bearing housing to secure the end cap to the bearing housing. The primary integrated seal serves to provide a seal between the circular mounting surface 20 and the bearing housing. Also shown is secondary seal 40 positioned on a back surface of and radially outwardly from retention ring 16. Secondary seal 40 provides for additional sealing between the end cap and the bearing housing. End cap 10 also includes a removal nub 22 located on sidewall 23 that provides a means for removing the end cap from the bearing housing. A screwdriver can be placed between the removal nub 22 and the bearing housing, and a force exerted against the nub in a direction away from the bearing housing will release the retention snaps 18 from the circular groove of the bearing housing to effect the removal of the end cap. The present invention may be used with end caps of varying sizes, depending on the bearing housing, size of the shaft, and geometry of the retention groove of the housing. Accordingly, the present invention can be applied and used on a wide variety end caps of varying shapes and sizes.

FIG. 2 depicts a cross-sectional view of bearing end cap 10, without a seal, positioned within bearing housing 60. Typically, an O-Ring type seal would be positioned in annular seal groove 14 in mounting surface 20 of the end cap to provide a seal between the end cap and the bearing housing 60. As shown, retention snaps 18 of retention ring 16 are adapted to interact with circular groove 24 of the bearing housing 60 to secure the end cap to the bearing housing. As noted, when using a conventional 0-ring type seal, the seal is provided separately from the end cap and can be removed, and subsequently lost or misplaced, during maintenance and repair.

FIG. 3 is a cross-sectional view of the bearing end cap 10 shown in FIG. 1. Primary integrated seal 12 is positioned in seal groove 14 in mounting surface 20. Primary integrated seal 12 preferably includes two wipers 13, that provide for improved sealing between the end cap and the bearing housing. Wipers 13 preferably extend beyond mounting surface 20 to provide a sealing contact with the bearing housing when mounted. In the embodiment of FIG. 3, a secondary seal 40 may be provided on a back surface of retention ring 16. Seal protrusion 38 is positioned radially outwardly from the retention ring 16 to provide an additional seal between the retention ring 16 and an inner surface 26 of the bearing housing shown in FIG. 2.

FIG. 4 discloses an alternative embodiment of the present invention showing a cross-sectional view of the end cap. This embodiment includes an integrated seal 12 positioned in seal groove 14 in mounting surface 20 of the end cap. Integrated seal 12 preferably includes two wipers 13, that provide for improved sealing between the end cap and the bearing housing. As in the embodiment of FIG. 3, the wipers preferably extend beyond mounting surface 20 to provide a sealing contact with the bearing housing when mounted. In this embodiment, the integrated seal 12 extends around the retention snap 18. Thus, integrated seal 12 may include portion 50 covering an outer section of mounting surface 20, a portion 52 positioned radially outwardly of retention snap 18, and a portion 54 covering an inward facing surface 19 of retention snap 18. If desired, the integrated seal could be further extended to cover the radial surface 32 of retention ring 16. Providing an integrated seal that covers the retention snap in this fashion provides for additional sealing between the end cap and the bearing housing. Preferably, the thickness of the seal that extends around the retention snap is 0.01 inches, although the thickness of the seal is not critical and can be of any suitable thickness.

FIG. 5 shows the end cap and integrated seal of FIG. 4 mounted to bearing housing 60. As shown, the wipers 13 of integrated seal 12 contact the bearing housing 60 to provide improved sealing characteristics. In addition, portion 50 of integrated seal 12 provides a seal between mounting surface 20 and the bearing housing, while portion 52 of integrated seal 12 provides a seal between the radially outward surface of the retention snap 18 and the circular groove 24 of the bearing housing, and portion 54 provides a seal between an inward facing surface 19 of retention snap 18 and surface 28 of groove 24. In addition, the integrated seal shown in FIGS. 4 and 5 could also be used in conjunction with a secondary seal, such as secondary seal 40 shown in FIG. 3.

The disclosed embodiments provide the advantage of improved sealing and allow the seal to be integrally connected to the end cap to prevent lost and missing seals. In a preferred embodiment the end cap 10 is comprised of polyproylene and is made using conventional injection molding techniques. The integrated seal 12 is made of an elastomeric material, such as Santoprene, and overmolded onto end cap 10 in a conventional overmolding operation. The overmolding process allows the seal to become integral with the end cap. Thus, the seal is said to be an "integrated seal." A two shot injection molding process or a coinjection molding process could also be used. However, it is also possible to provide the seals shown in FIGS. 3 and 4 without using an overmolding process by attaching the seals to the end cap. Seals affixed to the end cap in this manner are also considered to be "integrated seals" within the spirit and scope of this invention.

In addition, the present invention may be used in conjunction with the vented bearing end cap disclosed and described in copending patent application entitled "Vented Bearing End Cap" filed herewith, herein incorporated by reference.

While certain features and embodiments of the invention have been described herein, it will be readily understood that the invention encompasses all modifications and enhancements within the scope and spirit of the present invention.

What is claimed is:

1. A bearing end cap comprising:
    a frontwardly facing mounting surface;
    a sidewall extending rearwardly from the mounting surface and defining an opening within the mounting surface;
    a seal groove positioned in said mounting surface; and
    an integrated seal positioned in the seal groove.

2. The end cap of claim 1, wherein the integrated seal includes one or more wipers.

3. The end cap of claim 2, wherein the one or more wipers extend beyond the mounting surface.

4. The end cap of claim 1, further including a retention ring positioned opposite said mounting surface.

5. The end cap of claim 4, further including a secondary integrated seal positioned adjacent said retention ring.

6. The end cap of claim 5, wherein the secondary integrated seal is integrally molded to the end cap.

7. The end cap of claim 5, wherein the secondary integrated seal extends radially outwardly from said retention ring.

8. The end cap of claim 7, wherein the secondary integrated seal is integrally molded to the end cap.

9. The end cap of claim 1, wherein the integrated seal is integrally molded to the end cap.

10. The end cap of claim 1, wherein the mounting surface is adapted for a snap fit into a circular groove of a bearing housing.

11. The end cap of claim 1, further including a retention ring positioned opposite said mounting surface, said retention ring having a plurality of retention snaps.

12. The end cap of claim 11, wherein the plurality of retention snaps are uniformly spaced apart.

13. The end cap of claim 11, wherein the integrated seal extends over said retention snaps.

14. The end cap of claim 13, wherein the integrated seal further extends radially outwardly from said retention ring.

15. The bearing end cap of claim 13, wherein the integrated seal extends rearwardly from a rearward facing surface of the retention snaps.

16. The bearing end cap of claim 15, further including a secondary integrated seal positioned adjacent said retention ring.

17. The bearing end cap of claim 16, wherein the secondary integrated seal extends radially outwardly from said retention ring.

18. The bearing end cap of claim 13, further including a secondary integrated seal positioned adjacent said retention ring.

19. The bearing end cap of claim 18, wherein the secondary integrated seal extends radially outwardly from said retention ring.

* * * * *